United States Patent
Zou et al.

(10) Patent No.: US 9,679,243 B2
(45) Date of Patent: Jun. 13, 2017

(54) SYSTEM AND METHOD FOR DETECTING PLATFORM ANOMALIES THROUGH NEURAL NETWORKS

(71) Applicant: Apcera, Inc., San Francisco, CA (US)

(72) Inventors: Youzhi Zou, San Francisco, CA (US); Derek Collison, San Francisco, CA (US)

(73) Assignee: APCERA, INC., San Francisco, CA (US)

( * ) Notice: Subject to any disclaimer, the term of this patent is extended or adjusted under 35 U.S.C. 154(b) by 125 days.

(21) Appl. No.: 14/209,288

(22) Filed: Mar. 13, 2014

(65) Prior Publication Data

US 2014/0279779 A1 Sep. 18, 2014

Related U.S. Application Data

(60) Provisional application No. 61/785,211, filed on Mar. 14, 2013.

(51) Int. Cl.
*G06N 3/04* (2006.01)
*G06N 3/08* (2006.01)

(52) U.S. Cl.
CPC .............. *G06N 3/08* (2013.01); *G06N 3/049* (2013.01)

(58) Field of Classification Search
CPC ...................................................... G06N 3/049
See application file for complete search history.

(56) References Cited

U.S. PATENT DOCUMENTS

| | | |
|---|---|---|
| 6,202,157 B1 | 3/2001 | Brownlie et al. |
| 8,090,850 B2 | 1/2012 | Roach et al. |
| 8,321,515 B1 | 11/2012 | Gailloux et al. |
| 8,392,564 B1 | 3/2013 | Czajkowski et al. |
| 8,463,909 B1 | 6/2013 | Szabo et al. |
| 2002/0147645 A1 | 10/2002 | Alao et al. |
| 2004/0193459 A1 | 9/2004 | Delaney et al. |
| 2004/0240447 A1 | 12/2004 | Dorbolo et al. |
| 2005/0120242 A1 | 6/2005 | Mayer et al. |

(Continued)

FOREIGN PATENT DOCUMENTS

| | | |
|---|---|---|
| WO | WO 2007/110094 A1 | 10/2007 |
| WO | WO 2007/141648 A2 | 12/2007 |
| WO | WO2014159270 | 10/2014 |

OTHER PUBLICATIONS

P. Cortez et al., "Multiscale traffic forecasting using neural networks and time series methods", Expert Systems 29.2, 2012, pp. 143-155.*

(Continued)

*Primary Examiner* — Vincent Gonzales

(57) ABSTRACT

A system and method for detecting behavior of a computing platform that includes obtaining platform data; for each data motif identifiers in a set data motif identifiers, performing data motif detection on data in an associated timescale, wherein a first data motif identifier operates on data in a first timescale, wherein a second data motif identifier operates on data in a second timescale, wherein the first timescale and second timescale are different; in a neural network model, synthesizing platform data anomaly detection with at least a set of features inputs from data motif detection of the set of motif identifiers; and signaling if a platform data anomaly is detected through the neural network model.

11 Claims, 7 Drawing Sheets

(56) References Cited

U.S. PATENT DOCUMENTS

| | | |
|---|---|---|
| 2005/0138388 A1 | 6/2005 | Paganetti et al. |
| 2005/0226240 A1 | 10/2005 | Hoffmann et al. |
| 2005/0254651 A1 | 11/2005 | Porozni et al. |
| 2006/0034305 A1* | 2/2006 | Heimerdinger ......... H04L 67/12 370/408 |
| 2006/0036463 A1 | 2/2006 | Patrick et al. |
| 2006/0101171 A1 | 5/2006 | Grieff et al. |
| 2007/0156659 A1 | 7/2007 | Lim |
| 2008/0060080 A1 | 3/2008 | Lim |
| 2008/0140857 A1 | 6/2008 | Conner et al. |
| 2008/0263625 A1 | 10/2008 | Gomez et al. |
| 2009/0083390 A1 | 3/2009 | Abu-Ghazaleh et al. |
| 2009/0320088 A1 | 12/2009 | Gill et al. |
| 2010/0217853 A1 | 8/2010 | Alexander et al. |
| 2010/0306323 A1 | 12/2010 | Gourevitch et al. |
| 2011/0023096 A1 | 1/2011 | Xiao et al. |
| 2011/0265168 A1 | 10/2011 | Lucovsky et al. |
| 2012/0005286 A1 | 1/2012 | Bhasin et al. |
| 2012/0198038 A1 | 8/2012 | Porter et al. |
| 2012/0300615 A1 | 11/2012 | Kempf et al. |
| 2012/0324069 A1 | 12/2012 | Nori et al. |
| 2013/0117738 A1 | 5/2013 | Livingston et al. |
| 2013/0247133 A1 | 9/2013 | Price et al. |
| 2013/0263209 A1 | 10/2013 | Panuganty |
| 2013/0311778 A1 | 11/2013 | Cherukuri et al. |
| 2014/0129719 A1 | 5/2014 | Weber et al. |
| 2014/0280999 A1 | 9/2014 | Collison et al. |
| 2014/0282849 A1 | 9/2014 | Collison et al. |
| 2015/0082378 A1 | 3/2015 | Collison |

OTHER PUBLICATIONS

A. Khotanzad and N. Sadek, "Multi-Scale High-Speed Network Traffic Prediction Using Combination of Neural Networks", Proc. IEEE Int'l Joint Conference on Neural Networks, 2003, pp. 1071-1075.*

P. Barford et al., "A Signal Analysis of Network Traffic Anomalies", Proc. of the 2nd ACM Sigcomm Workshop on Internet Measurement, ACM, 2002, pp. 71-82.*

M. Andreaolini, M. Colajanni, and M. Pietri, "A Scalable Architecture for Real-Time Monitoring of Large Information Systems", 2012 2nd Symp on. Network Cloud Computing and Applicaitons, pp. 143-150.*

A. Ghosh and A. Schwartzbard, "A Study Using Neural Networks for Anomaly and Misuse Detection", Proc. 8th USENIX Security Symp., 1999, 12 pages.*

International Search Report and Written Opinion mailed Jul. 30, 2014 in Patent Cooperation Treaty Application No. PCT/US2014/022784, filed Mar. 10, 2014, 13 pages.

* cited by examiner

SYSTEM AND METHOD FOR DETECTING PLATFORM ANOMALIES THROUGH NEURAL NETWORKS

CROSS-REFERENCE TO RELATED APPLICATIONS

This application claims the benefit of U.S. Provisional Application Ser. No. 61/785,211, filed on 14 Mar. 2013, which is incorporated in its entirety by this reference.

TECHNICAL FIELD

This invention relates generally to the portable display field, and more specifically to a new and useful portable card display in the information display field.

BACKGROUND

Anomaly detection with a computing platform is important to monitoring and maintaining the health of the system. Anomaly detection can be used to alert developers and other system administrators to unexpected behaviors. However, building anomaly detection with the right granularity is challenging. If the anomaly detection is tuned or trained for normal day-to-day operation, seasonal spikes can result in false alarms. If the anomaly detection is tuned or trained for seasonal patterns, irregularities within smaller time frames may be missed. Thus, there is a need in the platform anomaly detection field to create a new and useful system and method for detecting platform anomalies through neural networks. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Detecting Platform Anomalies

Figure 1:
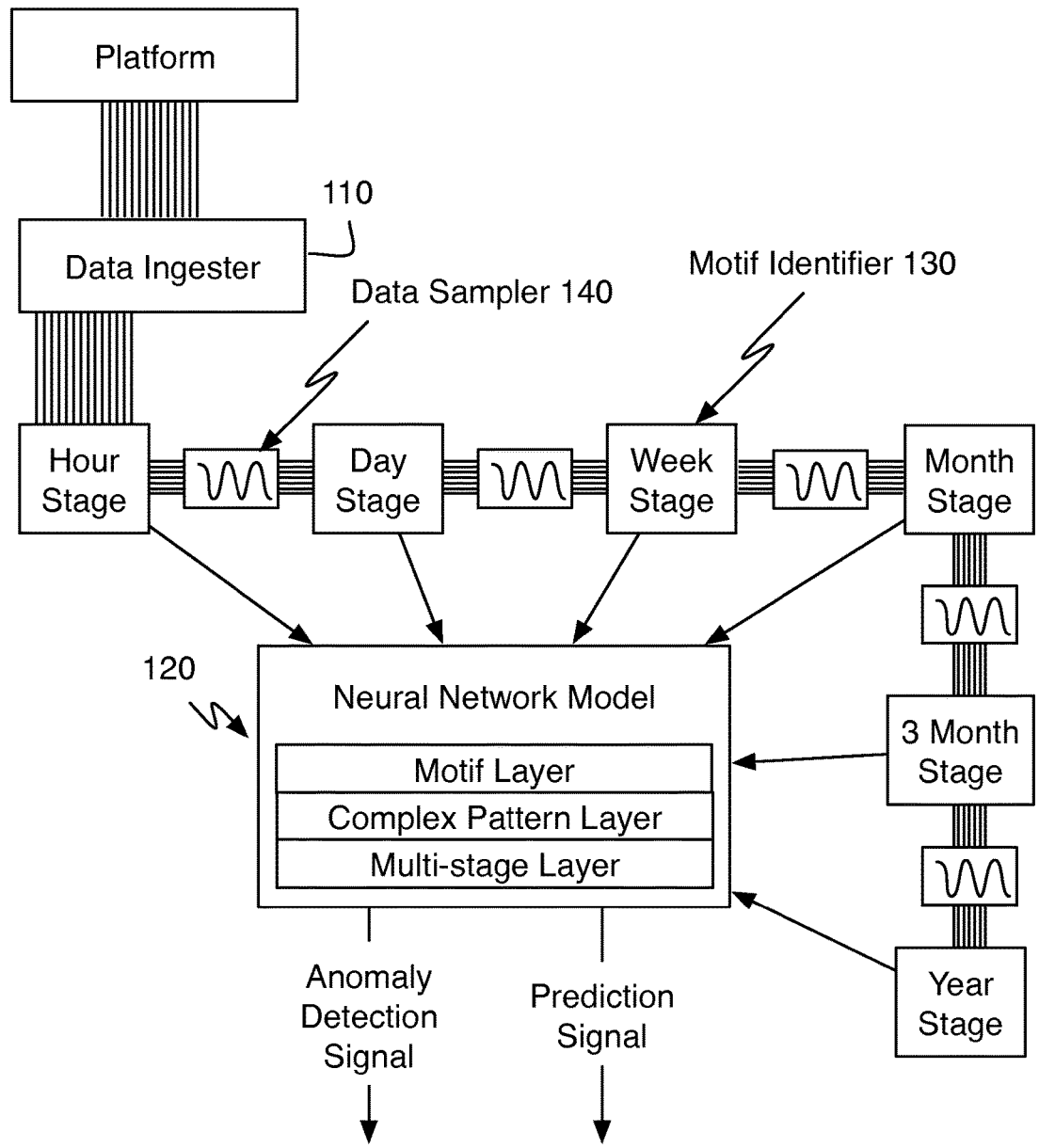
FIG. 1 is a schematic diagram of a system of a preferred embodiment.

As shown in FIG. 1, a system for detecting platform anomalies of a preferred embodiment can include a data ingester 110, a neural network model 120, at least two stages of motif identifiers 130, and a data sampler 140. The system functions to create a robust anomaly detection system that is resilient to multiple motif interactions. In a preferred implementation, the system can be resistant to triggering based on false motif variations and resistant to missing daily anomalies while considering seasonal patterns. There may be many factors that can cause deviations from normal day-to-day operation of a platform, and many of these deviations are normal. That is to say, the deviations have some historical precedence. The system is preferably architected to be capable of identifying anomalies within a variety of time scales. The system preferably uses multiple motif identifiers 130 in different stages to provide inputs into layers of the neural network model 120. The system can preferably identify anomalies in the operation and/or usage of a platform. The platform may be a PaaS, a SaaS, or an IaaS platform. Alternatively, the platform may be any suitable computing system such as an application infrastructure, a communication network, a storage center, a device network, or any suitable computing infrastructure. The system can be used for internal infrastructure monitoring. For example, the system can be built as an alert system for system administrators. In the variation where the data is a multitenant IaaS platform, the data can be segregated based on account, and the system (as a feature of the platform) can alert account administrators of irregular activity within their account. In yet another variation, the system can be a data analytics service that operates on data supplied by a third party.

The data ingester 110 of the preferred embodiment functions to collect the platform data. The platform data is preferably time-series data collected from various data channels of a data source. The data source is preferably operational data from a computing platform, but the data source may alternatively be any suitable data source. Operational data is preferably from numerous components throughout the platform. Additionally, several different types or channels of operational data are preferably collected. Operational data may include CPU processing capacity, memory usage, storage capacity, count of events, rate of events, timing of events, location(s) associated with events, entities (e.g., users or clients) associated with events, resource usage, and/or any suitable type of operational data. The data ingester 110 may actively retrieve or query data from the platform. Alternatively, the data ingester no may be an interface through which the platform or another source sends the platform data. In one implementation, the system can function to provide data analytics as a service wherein users of the service provide access to a data source or send data to the system. The data ingester 110 preferably collects a large amount of data in substantially real time. The data will preferably have a raw or base timescale in which the data is collected. In one implementation, the latency between data points can be five to ten milliseconds. Different data types can have different timescales. For example, resource can be collected every minute while billing events may be logged at a frequency of once per month. The data ingester 110 preferably collects data from a large variety of data sources. In one implementation, the neural network model 120 can work with thirty to fifty thousand parameters. A data type may contribute to one or more parameter. A large number of parameters preferably enable the neural network model 120 to encode a large number of patterns from the parameter settings. The operational data is preferably used in a raw format, but the operational data may additionally be pre-processed or conditioned before being used in the neural network model 120.

The neural network model 120 of the preferred embodiment functions as the collective machine learning algorithm for detecting a platform anomaly. The neural network map preferably uses the platform data collected by the data ingester 110 and outputs a signal that indicates the operational status of the platform. The neural network model 120 can be used in anomaly detection and/or to perform prediction. The neural network model 120 is preferably configured to learn from an online feed of multivariate time-series data and offer predictions over an arbitrary horizon. The operational status signal can include an anomaly detection signal, which can be an indication of a normal operation (e.g., following expected data motifs) or a detected anomaly. An anomaly detection signal can further classify or identify types of operational status. For example, normal high volume of usage can be indicated. Even though the usage is not typical for average daily operations, the high volume may be identified as typical for other motifs such as seasonal patterns. In the case of anomalies, the scope or type of the anomaly may be detected and communicated in the signal. For example, an anomaly may be labeled as a daily anomaly or seasonal anomaly. The anomalies detected by the system preferably include irregular or unexpected data patterns regardless of the type of pattern. Such exemplary anomalies can include higher volumes of resource usage, less volume of resource usage, events with a pattern related to its source, change in long-term growth, or any suitable type of atypical pattern. In another variation, the operational status of the platform includes a predictive signal of the platform. In one variation the neural network is a recurrent neural network that can preferably model a substantially infinite time horizon. As another variation, the neural network can be a multi-scale (e.g., multiple time lengths combined in an ensemble) feedforward neural network, but any suitable algorithmic process may be applied in the prediction.

The neural network model 120 is preferably initialized through a training phase. The neural network model 120 is preferably exposed to historical data (live, recorded or simulated) and learns patterns in the platform data through stochastic on-line algorithms. The neural network model 120 may alternatively be configured to use unsupervised learning. The neural network model 120 is preferably composed of several layers. A first layer is preferably for motif detection from the motif identifiers 130. In the training of the neural network model 120 additional motif identifiers 130 may be enrolled integrated into the system as the data from the data ingester 110 enables a new motif identifier 130 to be trained. A neural network model 120 in one implementation will progressively enroll motif identifiers 130 associated with increasing timescales such as adding a monthly motif identifier 130, then a seasonal motif identifier 130 and then a yearly motif identifier 130.

Figure 2:
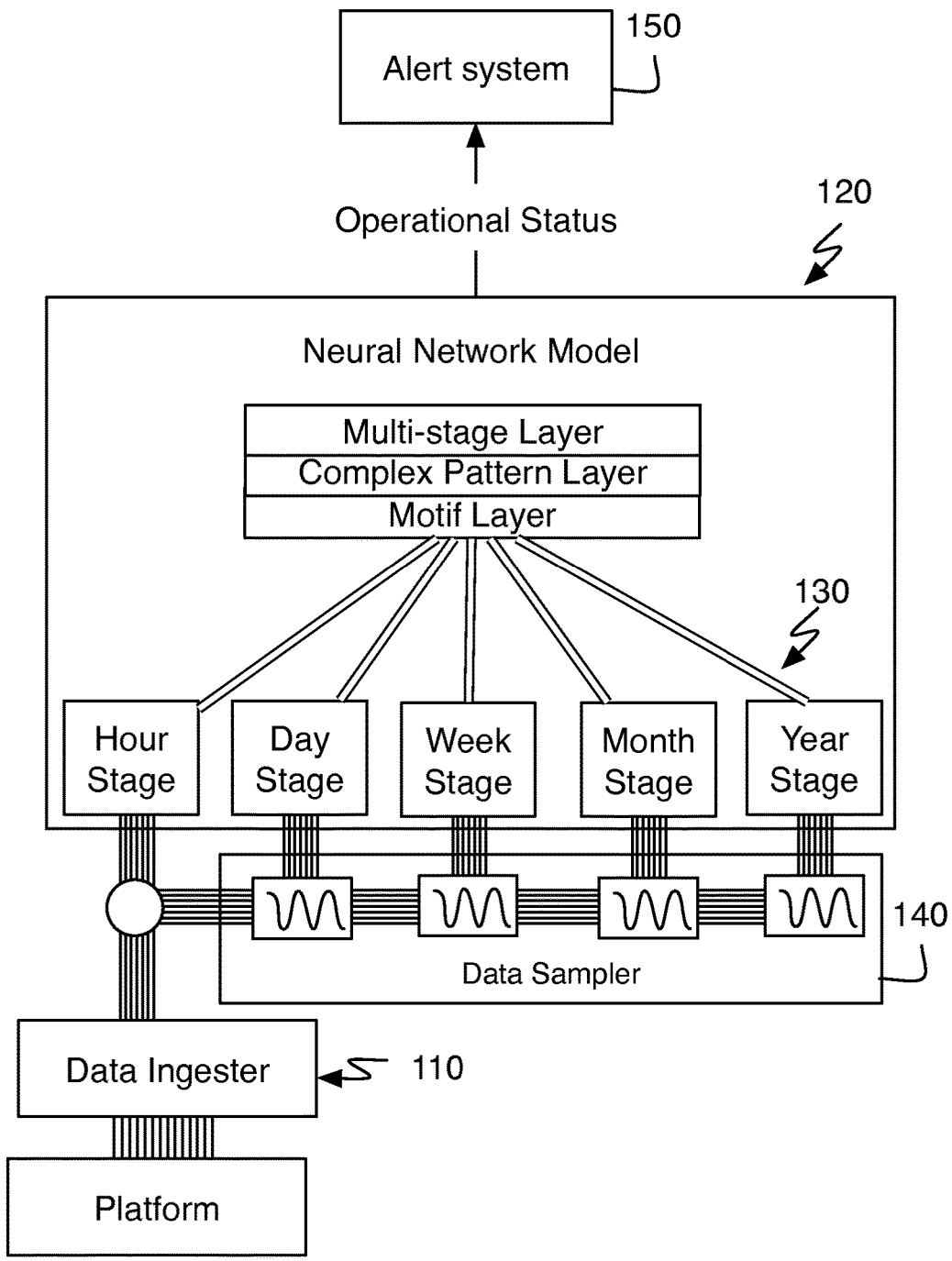
FIG. 2 is an alternative schematic diagram of a system of a preferred embodiment.

As shown in FIG. 2, a neural network model can include feature inputs supplied by a plurality of motif identifiers, and higher layers of the neural network model are preferably related to complex structures of the data. Complex structures preferably involve the combination and/or interaction of multiple motifs using the output of multiple motif identifiers 130. Another higher layer is preferably related to the sampling across different time frames. The neural network model 120 may additionally include a learning feedback loop wherein the neural network model 120 observes platform data as it performs anomaly detection and updates parameters of the neural network model 120 through stochastic gradient descent. Those parameters are preferably actively used in the active anomaly detection operation of the neural network model 120. The output of the neural network model 120 may be coupled or directly connected to a signaling interface or an event trigger.

The motif identifiers 130 of the preferred embodiment function to implement motif detection and/or prediction within a stage or layer of the neural network model 120. The motif identifier preferably output at least one signal, which may indicate motif detection and/or motif prediction. This motif anomaly detection is preferably considered within a first layer of the neural network model 120 to determine if an anomaly is occurring within the platform. Similarly motif data prediction can be considered within the neural network model 120, preferably in predicting future state of the data. More preferably the motif and/or anomaly detection from the motif detectors are used in combination to predict anomalies within the platform. A motif is preferably a recurring pattern in the platform data. The neural network model 120 preferably encodes the motifs within the weights and feature inputs of the first layer of the neural network model 120.

There is preferably a plurality motif identifiers 130 (i.e., motif identifier stages) defined for different timescales. There are preferably stages for short time frames (e.g., one hour, a day, and a week), and there are preferably stages for long time frames (e.g., a month, three months, and a year). There is preferably a set of motif identifiers 130 that provide a gradient selection of different timescales. The timescales can be selected to provide detection of motifs within different timescales of different magnitudes. Generally, the set of timescales are selected based on base the periods of periodic motifs encountered within the platform. In one variation, the actual timescales can be automatically learned and/or dynamically updated to fit the dynamics of the data. For example, platform usage will typically see patterns of usage of the course of one day, over a week, possibly over one month, and a year. Depending on the use case related to the data, the stages may use different combinations of timescales. One or more motif identifiers may operate on data within an original timescale. For example, the hour-based timescale may not require resampling the original collected data. Longer timescales may require resampling of the collected data to a frequency appropriate for the timescale. For example, a year-based timescale may use data sampled at a daily frequency. Preferably the data is sampled at a resolution to resolve motifs within the defined timescale. For example, a motif identifier 130 operating on data in a year timescale can resolve yearly data patterns. Motif identifiers 130 can additionally be progressively trained and enrolled into use with the neural network model 120.

Each motif identifier stage preferably works on a different set of sampled data. Though there can be variations where two motif identifiers operate on the same sampled data. The data is preferably sampled or based on the collected data from the data ingester 110. In one variation, the type of data operated on by two motif identifiers 120 can be different. For example, one motif identifier can operate on CPU performance data within one timescale and a second motif identifier can operate on event data in another timescale; the timescales could be the same or different. A neural network specific to the stage may be used to detect the motifs. Alternatively, algorithmic approaches within a stage may include distance based techniques (e.g., k-nearest neighbor, Local Outlier Factor), support vector machines, cluster analysis based on outlier detection, self organizing map, or any suitable algorithmic approach. Each motif identifier can output The data sampler of the preferred embodiment functions to sample collected platform data for a stage of a motif identifier 130. The motif identifiers 130 are preferably used in a series, where the data is sampled to characterize a larger time frame. The stages may alternatively be organized for parallel operation. For example, the first stage of a motif identifier 130 preferably identifies motifs in the raw platform data over past hour. The raw platform data is preferably sampled to characterize the past day, and this sampled platform data is the input to the second stage motif identifier 130. The second stage motif identifier 130, accordingly, identifies motifs for a daily sample of platform data. Another data sampler may resample the raw platform data or the data of the preceding stage (i.e., the daily time frame data) for yet another time frame. The third time frame may be 7 days, and the third motif identifier 130 identifies motifs over a weekly time frame. There may be any suitable number of stages, and any suitable time frames may be used for any stage. The sampling preferably works off the live platform data with low latency, thus the neural network model 120 can provide substantially real-time identification of anomalies.

The system can additionally include an alert system 150, which functions to execute some action in response to the output signal of the neural network model 120. The alert system preferably fulfills some actionable response to the operational status signal of the neural network model 120. The alert system 150 may transmit messages, update or alter the computing platform, log information, or perform any suitable response.

2. Method for Detecting Platform Anomalies

Figure 3:
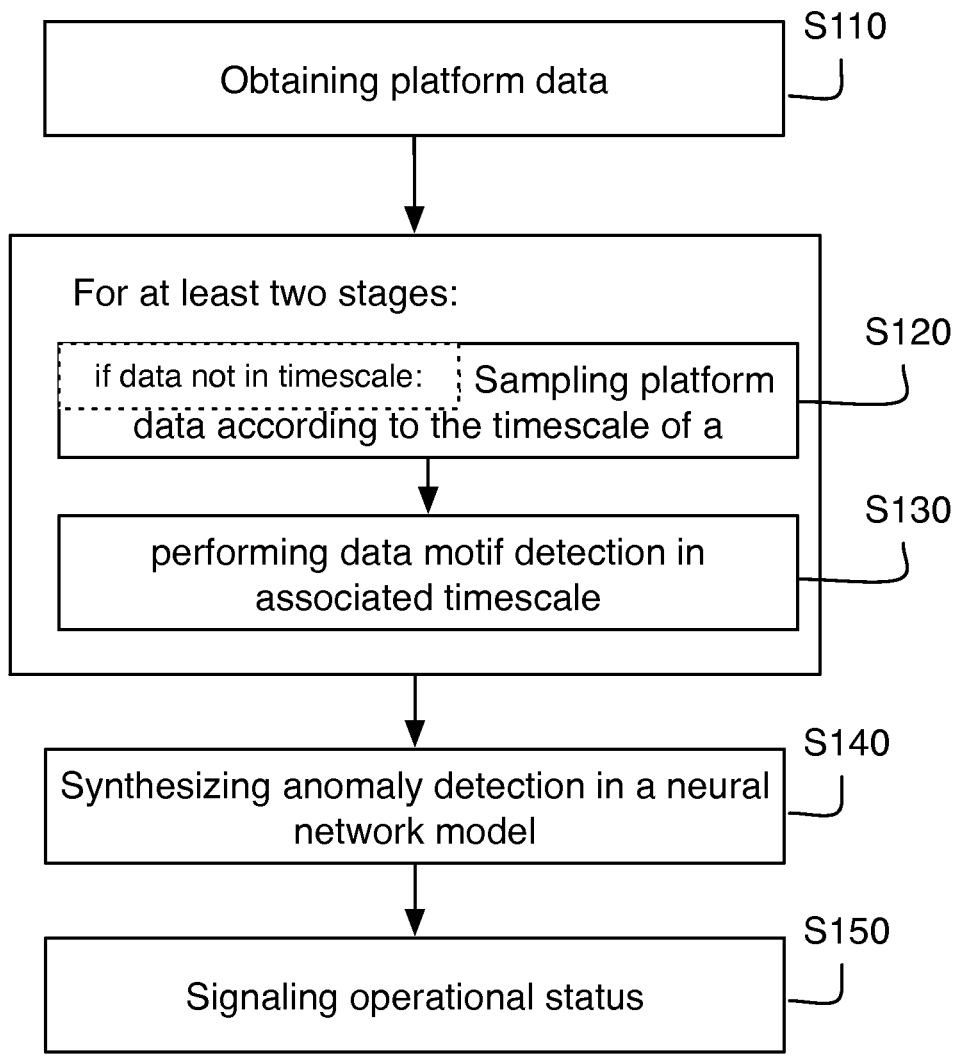
FIG. 3 is flowchart representation of a method of a preferred embodiment.
Figure 4:
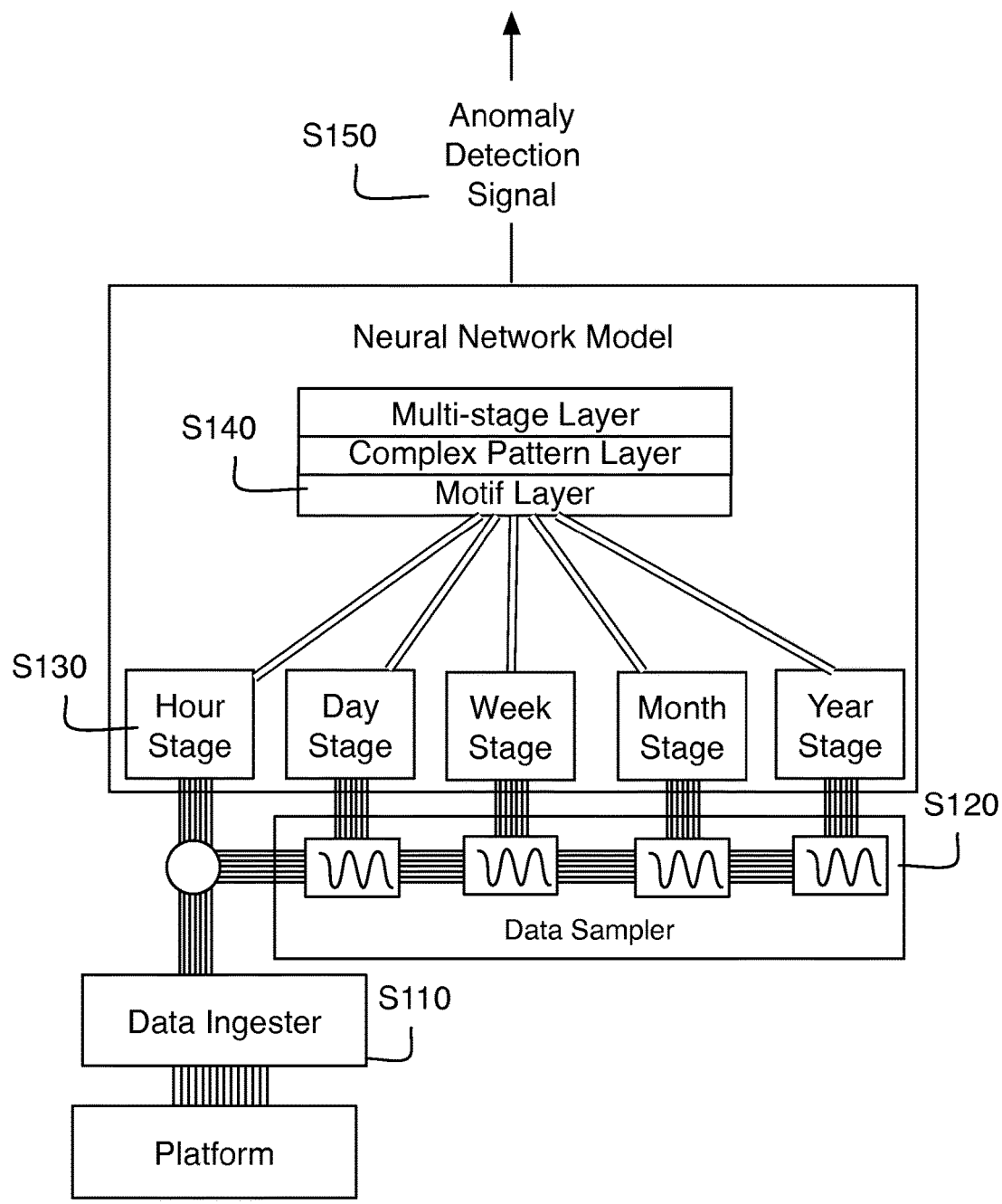
FIG. 4 is a schematic representation of a method of a preferred embodiment.
Figure 5:
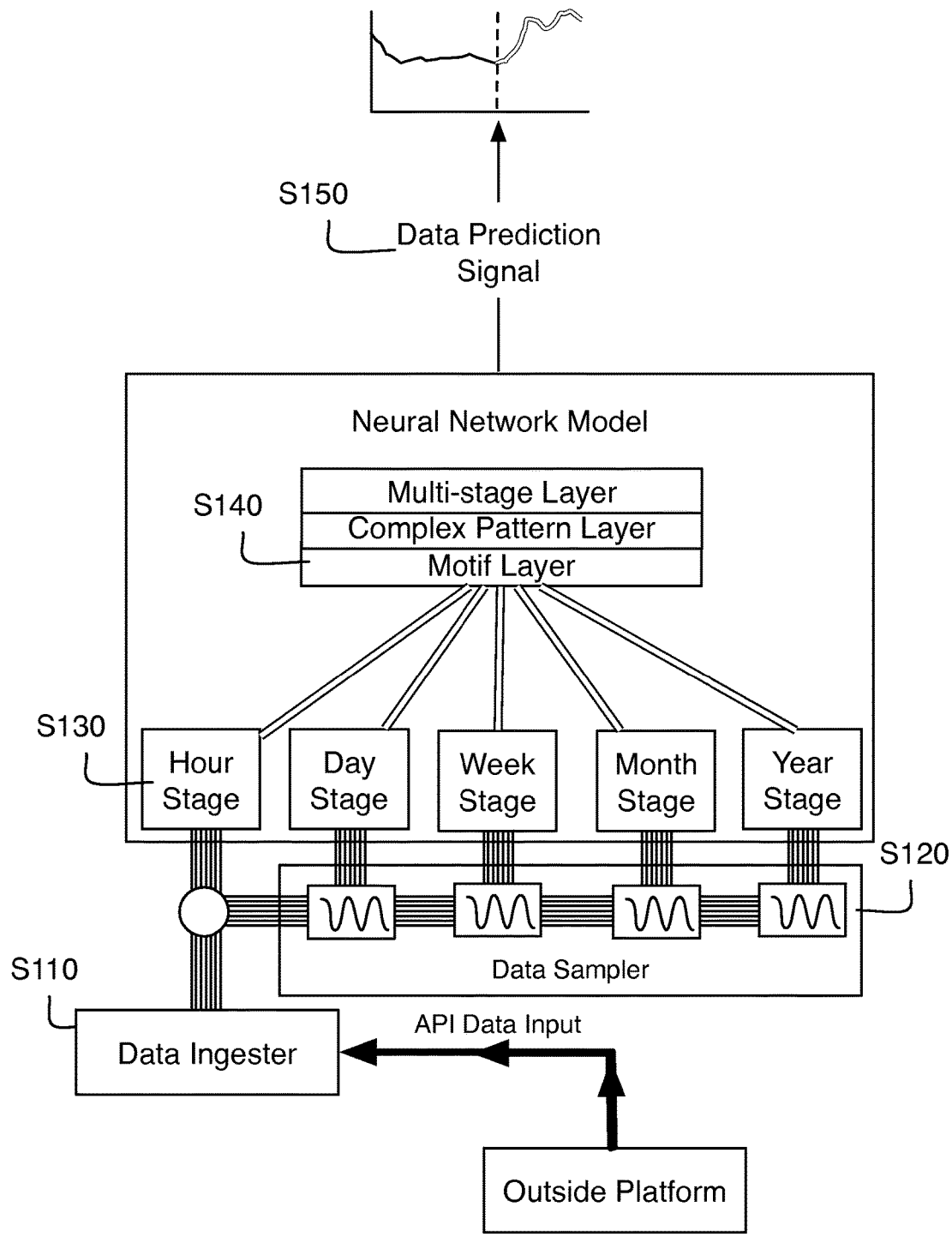
FIG. 5 is a schematic representation of a method of a preferred embodiment.

As shown in FIG. 3, a method for detecting platform anomalies through neural networks of a preferred embodiment can include obtaining platform data S110; for at least a first and second stage of anomaly detection sampling the obtained data according to the timescale of an associated data motif identifier stage S120 and performing data motif detection on data in an associated timescale S130; synthesizing data motif detection with at least a set of features from data motif detection S140; and signaling the platform operation status detected through the neural network S150. The method functions to use machine learning algorithms across various stages operating within different timescales. As one exemplary benefit, anomaly detection and data prediction can detect patterns otherwise obscured by interacting data motifs. The method can be applied to anomaly detection and/or data prediction. As shown in FIG. 4, the stages of anomaly detection preferably operate with various timescale modes. In one exemplary implementation, a first stage is for motif detection within the last hour; a second stage is for motif detection over the last day; a third stage is for motif detection over the last week; a fourth stage is for motif detection over the last 30 days; a fifth stage is for motif detection over the last 90 days; and a sixth stage is for motif detection over the last year. As the machine learning detection is applied across different timescales, the stages can collectively signal anomalies preferably without raising false alarms or missing anomalies. Similarly, the stages may collectively signal data prediction while considering complicated interactions between competing data motifs as shown in FIG. 5. In one implementation, the method can be used within a multitenant computing platform to alert account holders to unusual behavior on their infrastructure instance. In another implementation, the method can be used in a data analytics service provided to outside entities.

The method is preferably implemented for a cloud computing platform. The cloud computing platform may be any suitable system such as a multitenant system such as a platform as a service system, a software as a service system, infrastructure as a service system, or alternatively the system may be a private application or computing system. The method preferably uses a neural network model to synthesize the various patterns and signals. In a preferred implementation of the method, an anomaly detection system implements a feed-forward neural network with multiple layers of non-linearities. The multiple layers of non-linearities are composed of various detection and machine learning occurring within a stage and across stages. A first layer is preferably for motif detection from the stages of motif identifiers. A higher layer is preferably related to complex structures of the data. Complex structures preferably involve the combination and/or interaction of multiple motifs. Another higher layer is preferably related to the sampling across different stages. The multiple layers are preferably capable of encoding and storing complex patterns extracted from the data. The neural network model preferably outputs the anomaly signal that detects and/or predicts data state (e.g., future anomalies) in the platform.

Block S110, which includes obtaining platform data, functions to collect, capture, or receive data from the system of interest. Preferably, the data is time-series operational data from a platform. Obtaining platform data preferably includes collecting event records, resource usage, and other data types from within the computing platform. Operational data is preferably from numerous components throughout the platform. Additionally, several different types or channels of operational data are preferably collected. Operational data may include CPU processing capacity, memory usage, storage capacity, count of events, rate of events, timing of events, location(s) associated with events, entities (e.g., users or clients) associated with events, resource usage, and/or any suitable type of operational data. In one variation, the data analyzed is scoped to a particular entity such as an account, user, or client. For a multitenant computing system, multiple accounts have customized neural network models operating on their own data. In this variation, there can be some feedback between neural network models and possibly seeding of a neural network model during training by a trained neural network model. The operational data may be actively retrieved by the anomaly detection system. The platform may alternatively supply, submit, or receive the anomaly detection system with the data through any suitable interface. An API may be used to enable accessing data of an external computing platform. The operational data is preferably supplied in substantially real-time. Preferably, the operational data has latency of five to ten milliseconds, though any suitable latency may alternatively be used. Preferably the neural network model is configured to deal with a large number of parameters. However, the method can reasonably applied to delayed data or stored data not supplied in real-time. In one implementation, the neural network model can work with thirty to fifty thousand parameters. A large number of parameters preferably enable the neural network model to encode a large number of patterns from the parameter settings. The operational data is preferably used in a raw format, but the operational data may additionally be pre-processed or conditioned before being used in the neural network model.

The method for detecting platform anomalies with the neural network model, as mentioned above, may be composed of multiple layers of non-linearities. As part of the structure of that model, a series of stages of motif discovery and detection preferably occurs. Each stage preferably has a defined mode. A defined mode is preferably targeted at particular time frame of motifs, and the time frame of each stage is preferably targeted at a different magnitude or scale of time. For substantially each stage (i.e., motif identifier), the obtained platform data is preferably sampled (if required) and then patterns are detected within that stage. Initial stages (stages that operate at the original or native timescale of the data), sampling is not required.

Block S120, which includes sampling the collected data according to the timescale of an associated data motif identifier stage, functions to condition and select data appropriate for the stage. Sampling preferably occurs for each motif identifier operating on data not in the timescale of the original data. The samplers can be used in series, sampling data of previously sampled data. For example, a day sampler converts data for a day-based motif identifier and then a year sampler samples the data sampled data for a year-based motif identifier. Alternatively, multiple samplers can sample the originally collected data. Any suitable sampling approach may alternatively be used. In one variation, block S120 may be optional, and the motif identifiers natively operate at one sampling rate but are configured to focus motif identification/detection of an associated timescale. Preferably, each motif identifier from a set of motif identifiers is targeted at a different timescale. There are preferably a series of motif identifiers each for a timescale with different usage significance. In many scenarios, a platform will experience different patterns of usage for each hour of the day, for each day of the week, for different months, different seasons, and over the course of the year. Some platforms may additionally have timescales defined for past 2 weeks, 4 years, 10 years, or any suitable time frame. In one exemplary configuration of stages: a first stage may look at motifs in the first hour to detect short term patterns; a second stage may look at motifs over the past 24 hours to detect daily motifs; a third stage may look at motifs over the past seven days to look at weekly motifs; a fourth stage may look at motifs over the past days to look at monthly motifs; a fifth stage may look at motifs over the past 90 days to look at seasonal motifs; a sixth stage may look at motifs over the year to look at motifs related to the calendar year. In another variation, a graduated timescales of the motif identifiers can substantially approximate a continuous scale. For example, there could be hundreds of motif identifiers representing a more gradual progression from a real-time timescale to a year timescale or any suitable timescale. There can additionally be multiple motif identifiers operating within the same timescale. For example, two motif identifiers may operate within the same timescale but on different data types. Any suitable number of stages may be used and any suitable timescales may be used for each motif identifier. The time sampling of data is preferably taken from the real-time collected data. The initial stage preferably uses the real-time data, and data is not sampled. Subsequent stages preferably sample the real-time collected data or sample data from a preceding stage. The stages may additionally or alternatively use data sampled based on parameters other than time. Data may be sampled or otherwise selected for use in a stage based on properties of the data. In one variation, data may be sampled/selected based on geographic location. For example, a stage may look at motifs in data originating from US usage over the past 30 days to look at motifs from users in the US.

Figure 6:
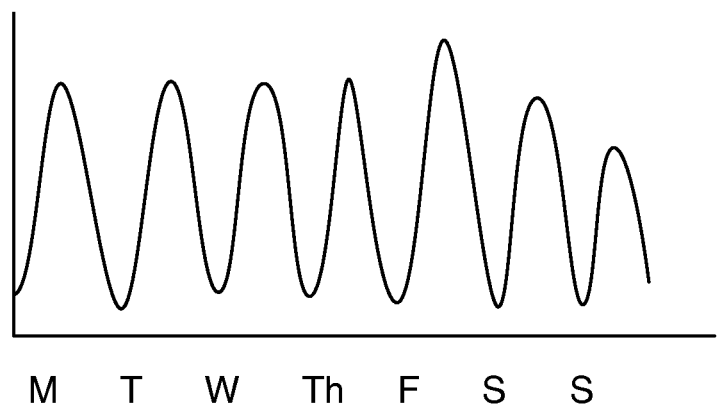
FIG. 6 is an exemplary motif for a weekly time frame.
Figure 7:
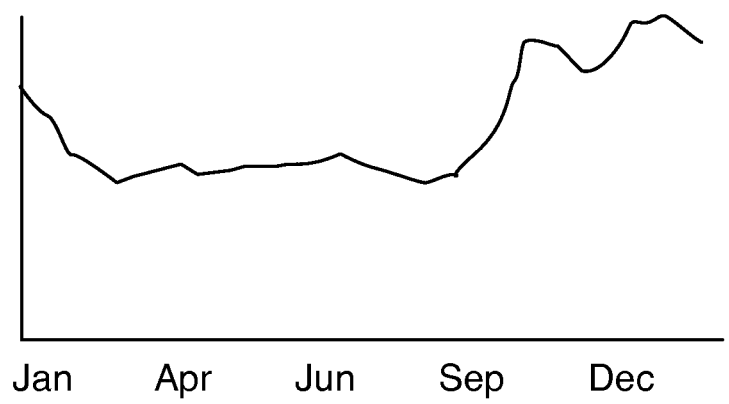
FIG. 7 is an exemplary motif for a yearly time frame.

Block S130, which includes performing data motif detection on data in an associated timescale, functions to apply machine learning within a motif identifier stage for anomaly detection or prediction. There is preferably a set of motif identifiers wherein at least a subset of those motif identifiers operate on data in different timescales. Another subset of those motif identifiers may operate on different data types (in different or in the same timescale). Motifs may be defined as small recurring patterns in the data. The motifs for different stages (i.e., motif identifiers associated with different timescales) can have different patterns. As shown in FIG. 6, data for weekly usage may have a cyclical pattern. As shown in FIG. 7, data for a yearly usage may see peaks around the winter holiday season. There may additionally be several motif patterns that can be detected within a particular time frame. When the platform data conforms to a motif within a stage, the identified motif can preferably be interpreted as indication that the platform data for that time frame is consistent with normal operation. The output signal of that particular can indicate a normal operation indication, an identification of the particular pattern, a signature representative of the motif, or any suitable output that can be leveraged by the neural network model in synthesizing overall operational status. When the data deviates from a normal set of motifs, there is preferably an anomaly within that time frame. Similar to Motif detection may be performed using any suitable algorithmic approach. A neural network specific to the stage may be used. Alternatively, algorithmic approaches within a stage may include distance based techniques (e.g., k-nearest neighbor, Local Outlier Factor), support vector machines, cluster analysis based on outlier detection, self organizing map, or any suitable algorithmic approach. The anomaly detection is preferably performed within each stage independently. The results of motif detection are preferably encoded as weights/features input in the first layer of the neural network model. The neural network model preferably uses these parameters to perform modeling, prediction, and detection on the motif level. An anomaly within a single stage, however, is not an indication that the platform is experiencing an anomaly. There may be several situations where one stage identifies an anomaly but the platform itself is operating as expected. For example, during the holiday season, a motif of the yearly motif identifier may expect there to be a spike in usage of the platform; for daily sampling of equivalent data, another motif identifier may not have a motif to characterize the increased traffic and may signal an anomaly. The neural network model will preferably use the collected signals and identified patterns to indicate that the platform usage/performance is not an anomaly in this situation. However, if that anomaly in the daily time frame occurs when the yearly stage does not account for such daily behavior, the neural network model will preferably indicated an anomaly. In a similar example for data prediction, a year-based motif identifier and a daily-motif identifier may be used in a neural network model in predicting a future state of the data according to the collected combination of motif identification within defined timescales. The motif detection from the plurality of stages is preferably collectively used in detecting an anomaly for the platform and/or in predicting subsequent data in block S140.

Figure 8:
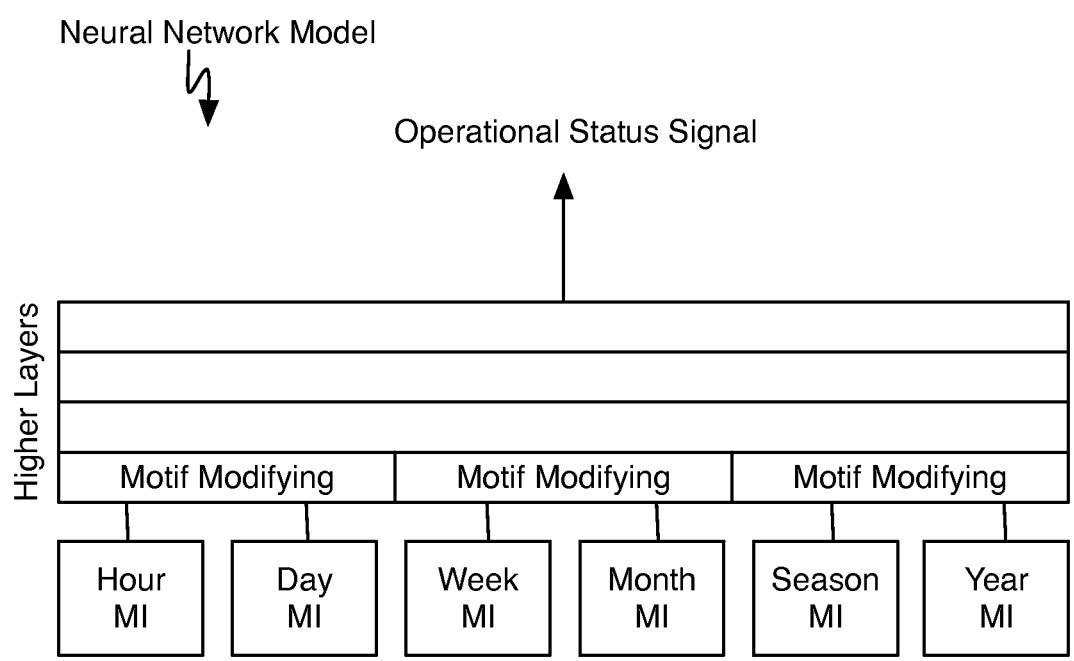
FIG. 8 is a schematic representation of the layers of a neural network model.

Block S140, which includes synthesizing data motif detection with at least one set of features from data motif detection, functions to allow the neural network model to model patterns that occur across different stages (e.g., time frames). The method preferably includes use of the output of at least two motif identifier stages, but preferably includes more than two motif identifiers. More specifically, the module takes as input, features extracted from the time series, and apply operations such as averaging, sub-sampling. These operations are performed in order that the neural network may perceive an appropriate time-window so that it is able to model motifs occurring in different time scales. The neural network preferably learns to detect data patterns through features inputs defined as the motif identifier outputs. The neural network model can additionally use other feature inputs. The patterns detected from different stages are preferably used within higher layers of the neural network model. In effect, the method preferably uses the collective occurrence of motif patterns and deviations from motifs within the stages to signal when the platform data is truly an anomaly as shown in FIG. 8. In the example above, platform usage is expected to be high during the holidays and so a detected anomaly for the daily stage is preferably weighted less than the motif of the yearly stage. Synthesizing anomaly detection may additionally or alternatively include identifying complex data structures, which functions to identify data patterns resulting from the combination of multiple motifs. A higher layer of the neural network model preferably discovers the complex data structures. As one example, two motifs may co-occur with particular magnitudes and be evident in the platform data. Complex data structures may additionally be motifs being modified due to motifs from other stages. For example, a motif for a year-long time span may alter a motif for a daily time span.

Block S150, which includes signaling the platform operational status detected through the neural network, functions to issue the result of the data analysis. Signaling of a platform anomaly preferably completes the transformation of component operation to an actionable indicator of the behavior of the platform. In one anomaly detection variation, the output indicates if an anomaly is detected. More preferably the output of the neural network model preferably indicates how much the data is deviating from predictions based at least in part on the set of possible continuations of the time series data as determined by the model. The signal may be a simple status message or indicator. In one variation, the signaling of a platform anomaly is a classified as a binary indicator with the states of 'normal operation' and 'detected anomaly'. The signal may alternatively be a measure of the anomaly (e.g., how severe), the expected duration of the anomaly, the likelihood of it being a true anomaly, the portions of the platform associated with the anomaly, or any suitable qualification of the anomaly. The output can further classify or characterize the current data pattern (normal or abnormal). For example, normal high volume traffic can be identified as normal, and an abnormal activity indication may distinguish between low usage, high usage, usage high for a particular data type pattern, and/or any suitable characterization of a data pattern. As mentioned above, data prediction could be used in combination with anomaly detection, indicating the predicted difference from normal behavior. This form of anomaly prediction can be for any suitable time window such as next term, next hour, next day, next week, next year. Further the prediction could be output as a function or as time series dataset (e.g., to generate a predict plot, highlighting anomaly periods). Alternatively, prediction could be used without the indication of abnormal behavior.

Alternatively or additionally, the signal may be an event trigger such that various actions can be performed when an anomaly is detected. In one implementation, an email, SMS message, phone call, or other suitable message is transmitted to a designated platform administrator when an anomaly is detected. The contacted administrator can then preferably review the status of the platform and make any updates to account for the irregular behavior of the platform. Additionally, the administrator response can be used in training or updating the neural network model. For example, the administrator may perform some action within the computing platform to confirm an anomaly or ignore the anomaly (i.e., mark as normal behavior). Similarly, the administrator may review previous operational status signals and edit the output such that data patterns that were marked as normal may be overridden and highlighted as abnormal. The event trigger may alternatively initiate automatic maintenance of the platform. The event trigger may be coupled to a script, API, software module, or device. Resources may be allocated, particular services may be enabled or disabled, or any suitable form of automatic maintenance may be performed.

In one variation, the method may be implemented as part of an anomaly detection service. Users (e.g., applications) of the service preferably supply data to the service. The data may be actively sent or transferred to the service. For example, an application may integrate with a logging SDK or framework that is used to log data and transfer the data to the service. Similarly, a PaaS, SaaS, or IaaS platform, could provide features around such anomaly detection. The platform can preferably provide various programmatic hooks or APIs to interface with the anomaly detection capabilities of the platform. For example, an application developer using a platform with anomaly detection could configure actions and response that should be triggered when an anomaly is detected.

The method may additionally include training the neural network model. The training is preferably performed using historical data. In one variation, the neural network model is operated in a training mode for a period of time where the model trains on active data. In another variation, historical data is played back to the neural network model. Alternatively, platform activity may be generated through simulations. The neural network model is preferably trained via a stochastic on-line algorithm, and as a result, the neural network model discovers patterns in the time-series data. The neural model is then enabled to make predictions and perform anomaly detection on unseen data. Preferably, the neural network model performs on-line training while simultaneously predicting anomalies. As the model observes more time-series data, the model preferably updates parameters through stochastic gradient descent. Thus the anomaly detection capabilities can adapt and improve as the neural network model is used. In an alternative embodiment, the method relies on unsupervised learning. New motif identifiers can be automatically or selectively enrolled into the neural network model. Training the neural network model can include collecting new data within a new timescale associated with a new data motif identifier, which functions to observer more time-series data and train the neural network model (and the new motif identifier). After, the new motif identifier is trained and detecting data motif patterns within the new timescale, the output of the motif identifier is enrolled in the neural network model to perform data motif detection on data of the new timescale. Training a new motif identifier functions to enable the neural network model to become operational based on the motifs the system has had time to learn, but to continually adapt to compensate for new motifs as they are observed over time.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the neural network model. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A system for monitoring usage of a computing platform, the system comprising memory and associated processing circuitry configured as:
   a data ingester that collects time-based data of a computing platform, wherein the time-based data comprises operational data collected for the computing platform and includes data of a plurality of data types, and wherein different types of the data among the plurality of data types may have a common timescale or have different timescales;
   a set of motif identifier modules, wherein each motif identifier is configured to apply a machine learning process within one timescale of the data and output a motif signal, the set of motif identifier modules comprising a raw motif identifier module that operates on data in a base timescale, at least one motif identifier module that operates on data from a substantially weekly timescale, at least one motif identifier that operates on data from a substantially yearly timescale;
   a set of data samplers, wherein a data sampler of one timescale couples a sampled data output to at least one motif identifier of the same timescale; and
   a neural network model that includes feature inputs of at least one layer coupled to the motif signal outputs, a combined motif layer, and including at least one output signal of the operational status of the computing platform the operational status selectively indicating normal operation or anomalous operation of the computing platform.

2. A method for detecting behavior of a computing platform comprising:
   collecting the time-based data for the computing platform, wherein the time-based data comprises operational data collected for the computing platform and includes data of a plurality of data types, and wherein different types of the data among the plurality of data types may have a common timescale or have different timescales;
   for each data motif identifier in a set of data motif identifiers, performing data motif detection in an associated timescale, wherein a first data motif identifier operates on the operational data in a first timescale, wherein a second data motif identifier operates on the operational data in a second timescale, wherein the first timescale and second timescale are different;
   in a neural network model, synthesizing platform data anomaly detection with at least a set of features inputs from data motif detection of the set of motif identifiers; and
   outputting, in dependence on the platform anomaly detection, signaling indicating normal or anomalous operation of the computing platform.

3. The method of claim 2, further comprising for at least a subset of data motif identifiers, sampling the collected data according to the timescale of an associated data motif identifier, wherein the associated data motif identifier operates on the sampled collected data.

4. The method of claim 3, wherein the first timescale is substantially an hour-based timescale, wherein the second timescale is substantially a day-based timescale, wherein a third data motif identifier operates on data in a substantially week-based timescale, wherein a fourth motif identifier operates on data in substantially a month-based timescale and wherein a fifth motif identifier operates on data in substantially a year-based timescale.

5. The method of claim 2, wherein a third data motif identifier operates on data in a first timescale, wherein a data set of the collected data operated on by the third data motif identifier is different from a data set of the collected data operated on by the first data motif identifier.

6. The method of claim 2, wherein synthesizing platform data anomaly detection further comprises combining output from multiple data motif identifiers in features of a higher layer of the neural network model.

7. The method of claim 2, further comprising training the neural network model.

8. The method of claim 7, further comprising collecting, as new operational data collected for the computing platform, new time-based data for the computing platform, within a new timescale associated with a new data motif identifier, and performing data motif detection on the new operational data when the new data motif identifier is trained.

9. The method of claim 2, wherein collecting the time-based data for the computing platform comprises collecting event records and resource usage from within the computing platform.

10. The method of claim 9, wherein collecting event records and resource usage is scoped to events and usage scoped to an account of the computing platform.

11. The method of claim 2, further comprising, in the neural network model, synthesizing platform data motif prediction with at least a set of features inputs from the data motif detection by the set of motif identifiers, and outputting signaling indicating a data motif prediction.

* * * * *